United States Patent [19]
Hait

[11] Patent Number: 5,617,249
[45] Date of Patent: Apr. 1, 1997

[54] FREQUENCY-MULTIPLEXED LOGIC, AMPLIFICATION AND ENERGY BEAM CONTROL

[75] Inventor: John N. Hait, Missoula, Mont.

[73] Assignee: Rocky Mountain Research Center, Missoula, Mont.

[21] Appl. No.: 454,070

[22] Filed: May 30, 1995

Related U.S. Application Data

[63] Continuation-in-part of Ser. No. 357,460, Dec. 16, 1994.

[51] Int. Cl.⁶ .................. G06G 7/00; G06E 1/04
[52] U.S. Cl. .................. 359/577; 359/108; 364/713; 364/809
[58] Field of Search .................. 250/216, 214 LS, 250/214 DC, 551; 359/1, 15, 108, 577, 107; 364/713, 807, 822, 826, 837

[56] References Cited

U.S. PATENT DOCUMENTS

| | | | |
|---|---|---|---|
| 3,680,080 | 7/1972 | Maure | 250/214 A |
| 4,386,414 | 5/1983 | Case | 364/826 |
| 4,764,889 | 8/1988 | Hinton et al. | 364/807 |
| 4,824,192 | 4/1989 | Roberts | 364/713 |
| 5,093,802 | 3/1992 | Hait | 364/807 |
| 5,109,156 | 4/1992 | Evans et al. | 250/214 A |
| 5,239,173 | 8/1993 | Yang | 250/214 S |
| 5,369,511 | 11/1994 | Amos | 359/15 |
| 5,414,789 | 5/1995 | Tamil et al. | 385/122 |
| 5,466,925 | 11/1995 | Hait | 250/216 |

*Primary Examiner*—Edward P. Westin
*Assistant Examiner*—John R. Lee
*Attorney, Agent, or Firm*—Leonard D. Schappert

[57] ABSTRACT

A means and method for performing frequency-multiplexed logic, amplification, and energy beam control functions on individual channels simultaneously within a single device by using a plurality of frequency-multiplexed inputs each having beam sets of matching channel frequencies and simultaneously producing a set of interference images, one for each channel, and separating energy from the images to produce a frequency-multiplexed output. The individual functions performed on individual channels are the result of constructive and destructive interference within each channel's image.

10 Claims, 2 Drawing Sheets

FREQUENCY-MULTIPLEXED LOGIC, AMPLIFICATION AND ENERGY BEAM CONTROL

REFERENCE DATA

This application is a continuation-in-part of U.S. application Ser. No. 08/357,460, filed Dec. 16, 1994.

BACKGROUND OF THE INVENTION

1. Technical Field

The present invention relates to optical computers and to the frequency multiplexing of photonic transistor functions such as amplification, Boolean logic, and control energy beam signals.

2. Background Art

The applicant's U.S. Pat. No. 5,093,802 contains the background art for the present invention. It uses interference between modulated and unmodulated input beams of wave-type energy. The functions are defined in terms of constructive and destructive interference component regions at a fringe component separator, such as a mask, which is used to separate energy from at least one component region to provide at least one output. Interference is produced between input beams of coherent energy capable of producing the interference fringes and the various outputs described.

That patent provides several functions, including a two-input OR, an EXCLUSIVE OR, an inverter, and an amplifier, and various bistable devices, all having outputs which are waveforms superimposed on single-frequency carrier waves. Absent from the prior art are any means or method for frequency multiplexing or the simultaneous operation of multiple independent functions using multiple-carrier wave frequencies within a single device. At the time of the writing of U.S. Pat. No. 5,093,802, it was recognized that such devices were not limited to one certain wavelength, as indicated by the following from col. 11 line 14 of U.S. Pat. No. 5,093,802:

"Since the ability to separate component regions of an interference fringe, as required by the present invention, is not limited by the wavelength of the wave-type energy used, the operational wavelengths are able to be selected from the visual range of the electro-magnetic spectrum. Then a group of multiple outputs such as (104) are able to function as a direct visual display output. By using multiple wavelengths, simultaneously or in rapid succession, the multiple outputs are able to function as a full color visual display."

While a group of devices designed to operate at more than one wavelength, as with the red, blue, and green wavelengths needed to produce a full-color display, would require "multiple outputs" and thus multiple components, the idea and mechanism for accomplishing simultaneous frequency-multiplexed operation within a single device was not yet apparent. Later, after having discovered the means for implementing frequency multiplexing, the applicant also recognized the advantages of frequency multiplexing.

SUMMARY OF THE INVENTION

The present invention comprises a means and method for providing frequency-multiplexed functions including logic, amplification, and energy beam control. A common set of optics produces simultaneous, independent functions on independent frequency channels within a single device. Individual channels of the frequency-multiplexed output contain the results of individual functions performed on the channels individually.

Input beams contain multi-frequency energy wherein individual frequency channels function as independent carrier waves that are modulated independently with information which is to be used within the invention. The invention has a plurality of such frequency-multiplexed inputs. Interference is produced simultaneously among all of the inputs which produces a separate interference image for each carrier wave frequency channel. Because common optics are used to produce interference, all of the images tend to overlap each other in the same general area, although some frequency separation does take place.

While the overlapping images can be called a composite image, the fact is that a modulation change in a single channel produces a change in only that interference image which has been produced by energy of that particular wavelength. The other images produced by energy from the other channels are unaffected.

An image component separator, such as a mask, permits energy to pass through into the output from one or more locations that are chosen specifically because of their relationship to the individual images. As a result of overlapping, the output is taken from the individual images from these same locations at the same time. The function performed using energy from each individual channel depends upon the modulation characteristics of the input beams for that channel, the shape of the interference image for that channel, and locations within that image from which energy is being taken. These parameters can be engineered into a particular device by the proper selection and orientation of optical elements, and by the selection of modulation patterns and phases of the individual channels.

As a result, the present invention can provide the logical AND for one channel, the logical OR for another, an amplifier for a third, and so on, depending upon the individual parameters for each channel as they relate to the common optics being used.

When common optics are used, the output is also frequency-multiplexed, and it contains the results within each channel of the function performed individually within the invention.

Frequency-multiplexed logic has the advantage of reducing the number of optical components needed for controlling many signals. For example, the individual bits of a complete frequency-multiplexed word can be gated on and off, individually or as a group, by controlling the input signals to a single device.

The present invention can be accomplished using any wave-type energy that produces interference, including acoustical waves, moving particle waves, and electromagnetic waves. Multiplexing acoustical waves and particle waves is, however, more difficult than with electromagnetic waves because the wavelengths involved function at different velocities. Nevertheless, the present invention will operate using these other energy types. Thus, these other energy types can be used to provide image sensing and multiple-speed electron manipulation using interference. For the sake of consistency and understanding, optical terminology will be used herein.

Holograms produce interference images from multiple beams or sets of beams. Since holograms and, in particular, computer-generated holograms, are a convenient way of implementing the present invention, inputs to the invention are next described as being sets of beams that are modulated together as if they were a single beam. This is done because many rays or beams combine to produce a holographic interference image or fringe. Groups or sets of input beams then function in unison to produce various interference image patterns that determine the outputs.

Holograms also have the ability to produce overlapping images that are frequency-compensated so that the overlapping positions of the individual channel images can be located as needed to match a certain image component separator. Computer-generated holograms can also be used to produce the image component separators. This allows the holographic designer to produce complex optical arrangements for the present invention that are able to produce an engineered interference-producing optic with a matching engineered image component separator so that the optics can be engineered to provide specific functions on specific channels.

The individual interference-based functions that occur within individual frequency channels are described in U.S. Pat. No. 5,093,802, which describes certain interference-based functions using single frequency images ("fringes"), and U.S. application Ser. No. 08/357,460, filed Dec. 16, 1994, of which this application is a continuation-in-part, which describes the use of "Special Interference." The operation of these individual functions is explained briefly below.

Interference is produced by superposition of monochromatic (or quasi-monochromatic) energy. Interference redistributes the energy from the input beams into an interference image, or fringe, made of areas where destructive interference (DI) and constructive interference (CI) occurs. When a portion of the interference image is separated into an output, the output waveform depends on the location(s) within the image from which the output is taken, and on the modulated waveforms of the input beams. As various instantaneous combinations of the input beams occurs due to modulation of one or more of the input beams, the output amplitude from any one location is the instantaneous vector sum of the energy from the interfering input beams. If the output is taken from many locations, the output will be a combination of the signals taken from each location within the image.

When DI occurs at a certain location within the image during a designated state or relationship of input beam modulation patterns, that location can then be called a "DI location," even though over time many combinations of DI, CI, and other energy combinations occur at that same location. The same is true of "CI locations." Such designations provide a convenient reference between the instantaneous relationships of the modulated input beams and the output relationships that result from outputting energy from that particular location.

When energy from a DI location provides the output and the input beams are binary-modulated, the output follows the Boolean Exclusive OR function with the addition of a phase-modulated component. If one beam is held on, the NOT function is produced. If the other input beam is analog-modulated, the output has an inverted waveform. If energy is separated from a CI location and one beam is held on, the output is an amplified signal having more modulated energy than the amount of energy in the modulated input. If both inputs are binary-modulated, the OR function is produced. Separating energy from other places within the image produces other combinations of output waveforms having various phase modulation characteristics.

The present invention is an improvement over U.S. Pat. No. 5,093,802, which uses Young's type interference, in that now multiple independent, frequency-multiplexed functions can be accomplished simultaneously within a single device rather than requiring separate devices for each frequency as before.

Special interference adds another important range of interference-based functions that can now be incorporated into the present invention for frequency-multiplexed operation.

Young's type interference includes any type of interference that produces energy relationships in its interference image components similar to those of the classical double slit experiment, regardless of what type of interferometer is used to produce them. These mathematical relationships for Young's type interference are defined in the following basic discussion of special interference, taken from U.S. application Ser. No. 08/357,460:

"Basic theory of operation.

Applicant theorizes that the amplitude and intensity of energy at the purely constructive interference locations, using the first type of special interference, are able to be calculated using an adaptation of the standard vector sum of amplitudes method used with other interference phenomena.

The basic formula for intensity has been derived from the law of cosines and considers just two incoming rays. That formula is:

A=amplitude of the first beam.
B=amplitude of the second beam.
Theta=phase difference between the two beams.

Intensity=$I=A^2+B^2+2AB$ Cos(Theta)

The Total amplitude $T_{ci}$=square root of I, just as $A^2$=the intensity of amplitude A.

At the center of the constructive interference (CI) area, Theta=0, and the Cos(Theta)=+1. At the center of the destructive interference (DI) area, Theta=180 degrees, and the Cos(Theta)=−1. As a result, the vector sum of two amplitudes at these two locations is also the algebraic sum of the amplitudes.

The two rays are in phase in the CI area, so the sum has that same phase. As a result, the CI intensity formula is, $I_{ci}=A^2+B^2+2AB=(A+B)^2$ In the DI area:

The two rays are out of phase in the DI area, so that the vector sum is the difference of the two amplitudes, which takes on the phase of the largest of the two. If they are equal, the algebraic sum is zero. The DI formula for intensity becomes:

$I_{di}=A^2+B^2-2AB=(A-B)^2$

These two conditions are also able to be viewed as the vector sums of three different rays, which will be labeled $B_1$, $B_2$, and U. In the DI area, $B=-B_1=B_2$, so that U is the difference between A and B, and A=B+U When A is on by itself, the amplitude at location 1 is the vector sum of $B_1$ and U. The intensity is $(B_1+U)^2$.

When beam $B_2$ comes on it combines with the first two. Since it is 180 degrees out of phase with $B_1$ and U, the totals of amplitude and intensity are as shown in formulae 1.

Formulae 1, DI location for all of the interference types:

$T_1=T_{di}=B_1+U-B_2=U$ $I_1=I_{di}=(B_1+U-B_2)^2=U$ also, by substitution we get:

$$I_1 = I_{di} = A^2 + B^2 - 2AB = (B+U)^2 + B^2 - 2B(B+U)$$
$$= B^2 + 2BU + U^2 + B^2 - 2B^2 - 2BU$$
$$= U^2$$

This is exactly what is expected because the amplitudes add algebraically, and the intensity is the square of the amplitude.

This indicates that the addition of an out-of-phase beam smaller than the first beam leaves energy having an amplitude equal to the difference of the two. If it is viewed as the sum of three beams, two of which are equal in amplitude but of opposite sign, the third beam is equal to the amplitude of the energy remaining at this location after all three have been summed.

The process of interference relocates energy within a fringe image. The equivalent amount of energy that is missing from the DI areas appears in the CI areas. As shown above, when two unequal beams interfere destructively, not all of the energy in the DI areas is relocated into the CI areas. The remainder is exactly equal to the difference between the two unequal beams. This remainder has not been relocated; it continues to arrive at the DI location. As a result, this remaining energy is able to be called 'undiverted' energy, because it has not been diverted into the CI areas by the interference.

As a result, one is able to describe the energy which is apparently missing from the DI area as 'diverted' energy.

In Young's CI area:

In the case of Young's type interference, the amplitude of energy arriving at a second location, namely the CI area, when only one beam is on is A. A is able to be considered as the sum of two amplitudes $B_1$ and U.

Again, when beam $B_2$ comes on, it combines with the first two. Since it is in phase with $B_1$ and U, $B=B_1=B_2$, and the totals of amplitude and intensity are as shown in formulae 2.

Formulae 2, Young's interference type in either amplification or saturation:

$$T_2 = T_{ci} = B_1 + U + B_2 = 2B + U$$

$$I_2 = I_{ci} = (B_1 + U + B_2)^2 = (2B+U)^2$$

also, by substitution we get:

$$2 = I_{ci} = A^2 + B^2 + 2AB = (B+U)^2 + B^2 + 2B(B+U)$$
$$= B^2 + 2BU + U^2 + B^2 + 2B^2 + 2BU$$
$$= 4B^2 + 4BU + U^2$$
$$= (2B+U)^2$$

This is also exactly what is expected because the amplitudes add algebraically, and the intensity is the square of the amplitude.

In this case, Young's type interference has energy directed to this CI location when only one beam is on. It is able to be viewed as having two components. When the second beam comes on, energy from the DI area is diverted into the CI area. As shown above, the amount added to the CI area by interference exactly equals the amount removed from the DI area.

As a result, two equal parts exist, $B_1$ and $B_2$. One came from beam A and the other from beam B. The difference between the two is U.

In both the CI case and the DI case, U remains unchanged. It has been called 'undiverted' energy. Apparently, it remains unaffected by the interference that is taking place between $B_1$ and $B_2$, even in the CI area.

If B rises become equal with A, U drops to o at both places. The resulting interference image goes completely dark at the DI location, and the intensity at the CI location goes to $4A^2=4B^2$. All of the energy contributes to the interference image.

When A and B are not equal, the image formed is able to be viewed as being the sum of two images. One image is the interference image formed by portions $B_1$ and $B_2$ in the familiar interference fringe pattern. The other image is a consistent spot, having no contrast change from one part to another; its amplitude equals U, and its intensity is $U^2$.

As a result, U, the difference between two unequal beams, can rightly be called 'undiverted,' for it arrives at the same locations and in the same pattern as when $B_1$ and $B_2$ are off.

$B_1$ and $B_2$ are rightly called 'diverted' energy, because this energy has been rearranged, or 'diverted,' in order to form the interference image. In that image, the energy from the DI location is diverted into the CI location to combine with an equal contribution from the other beam that will arrive there anyway in the absence of interference.

In special interference:

Next, we examine special interference. Special interference has no contribution to location 2, the CI location, when only one beam is on. This occurs because the beams are small in comparison to the DI location, and are directed only toward the DI location, and are not spread out to cover the location where CI will eventually take place.

The DI area functions exactly as described above, as having two in phase beams from A, with the out-of-phase B.

The CI area has no energy in the absence of interference. Most importantly, it has no 'undiverted' energy (that is, U=0).

When the second beam ($B_2$) comes on, interference occurs producing an interference image that removes energy from the DI location, ($B_1-B_2$), leaving U as residual energy.

The energy removed from the DI location is diverted into the CI location as $B_1+B_2$. It has an intensity of $(B_1+B_2)^2$.

Again by substitution we get:

$$I_2 = I_{ci} = A^2 + B^2 + 2AB = (B+U)^2 + B^2 + 2B(B+U)$$
$$= B^2 + 2BU + U^2 + B^2 + 2B^2 + 2BU$$
$$= 4B^2 + 4BU + U^2$$
$$= (2B+U)^2$$

However, U=0 at this location, producing the important relation as shown in formulae 3.

Formulae 3, first interference type in either amplification or saturation:

$$T_2 = 2B$$

$$I_2 = (2B+0)^2 = 4B^2$$

As a result, a formula for the first type of special interference has been derived for both the amplitude and the intensity.

The total amount of energy in any one application depends upon the area of CI and the area of DI, because they are able to be made up of many rays, even thousands or billions of rays. The total energy is able to be expanded to cover large areas, or focused to small areas. The output characteristics will be a function of the size, locations, and the ratio of output area to image area of the image component separator relative to the image. Contributions of energy from the other parts of the image that are not pure CI or DI also contribute to the overall operation of the invention.

The importance of these formulae to the process of amplification and limiting cannot be overstated. As an example, a substantially constant power beam A that is directed to location 1 and a control beam B (which is smaller than A) produce an interference image at locations 1 and 2, with DI at 1, and CI at 2.

The output intensity is $4B^2$, and the amplitude is $2B$. It does not matter how much larger A is than B, within the limits of the breakdown of the optics or other factors that would physically change the arrangement. Energy diverted Into the output Is directly proportional to the control beam B.

When the control beam is amplitude modulated, the output is also amplitude-modulated, having twice the amplitude of the control beam. The energy in the information carrying portion of the output waveform has been doubled. Unlike the amplifier of the prior art that uses Young's interference, the present invention does not produce the residual output U, the undiverted leftover energy that does not contribute to the interference image.

As long as the modulated beam is smaller than the constant beam, the output will be amplified. The output amplitude is always double the smaller of the two.

Next consider what happens when the modulated control beam rises above the level of the constant power beam. With B>A, for any given instant the output will be twice the smaller of the two. It is the same as switching the beam names in the formulae above. Because the smaller one is also the constant one, the output will be a constant 2A no matter how highly B is modulated, again within the realm of not destroying or modifying the optical arrangement. This condition is called 'saturation.' All of the energy from beam A that is able to be has been diverted into the output.

As a result, the amplification curve of the present invention is NON-LINEAR. Non-linear optics that operate at the speed of light is able to accomplish many tasks that are otherwise impossible. A modulated waveform will be limited and clipped at the point where the two input beams are equal.

Second type of special interference:

The second type of special interference is also able to be viewed as having three component amplitudes. The power beam (A) is directed to the DI location; none of it is directed to the CI location, just as with the first type of special interference.

The control beam (B) is directed to both locations. For that reason, this type of interference will not produce a logical AND in a single stage; however, it makes an excellent amplifier.

When the control beam is off, $I_2=0$, and $I_1=B_1+U$.

When the control beam is less than the substantially constant power beam, $A=B_1+U$, and $B=B_2$. The amplitude at location 1 will be $B_1+U$.

Formulae 4, 2nd interference type in amplification:

Amplitude=$T_2=B_1+B_2=2B$

Intensity=$I_2=(B_1+B_2)^2=4B^2$

This is the same as with the first type of special interference. The difference appears when the arrangement goes into saturation. When that occurs, the undiverted energy (U), which equals B-A (because B is larger) does not come from the power beam. In this case the residual energy comes from the control beam which is directed straight into the output. As a result, the output during saturation is as shown in formulae 5.

Formulae 5, 2nd interference type in saturation:

Amplitude=$T_2=B_1+B_2+U=2B+U=2A+U$

Intensity=$I_2=(B_1+B_2+U)^2=4A^2+4AU+U^2$

Amplification is reduced because A is constant. All of the available energy of the power beam has been diverted into the output. Further increases in B only increase the size of U, which is not doubled. When squaring to produce the intensity, the 4AU factor indicates that there exists some interaction with energy from other parts of the interference image, but U remains the same.

As a result, this second type of special interference behaves like the first type of special interference when B<A. However, it behaves like Young's interference when B>A. Amplification is still limited somewhat, but it is not clipped.

Broad band and narrow band arrangements.

The above-described process is phase-dependent. The energy removed from the DI location is relocated in the CI position. But what if the signals arrive at the first location at some other phase? In this case, the CI position is at some other location, resulting in near binary operation of a phase-modulated signal. The inputs would have to be exactly out of phase in order for the CI location to be the same as the output location.

In practice, the optics used will have to be engineered in wavelength units and wavelength sizes. Most optical arrangements rely on an averaging of energy from multiple points of the cross-section of an input beam. Averaging of energy from these multiple points produces the familiar sinusoidal interference fringe.

If the amplifier is engineered to include a large number of such points so as to use the averaging principle, then it will have a wide bandwidth and will be able to function using a number of input frequencies. The output locations function as if a group of controllers were placed side by side, each one using an individual ray set.

In this case, the output hole includes a large number of wavelength size locations. For slightly different phases and slightly different frequencies, the CI location from each pair of input locations will be at slightly different output locations. If those output locations happen to be within the area of the hole, the energy will output. If they are not, it will not.

Modern optics is capable of operations at wavelength sizes. Wavelength size input beams and wavelength size output holes will produce processes that operate considerably differently from the multiple-location averaging style of optics. The more precise the optics are, the more precisely phases and frequencies must be in order for the CI area to hit the output hole.

Wavelength size precision will cause a phase-modulated signal to output only when the phase is close enough to 180, at the first location, in order for the CI area to hit the wavelength size output hole. The output from an analog phase-modulated signal would be a binary output that occurs only when the two inputs are exactly out of phase.

If multiple frequencies are used, the only ones that will be able to hit the output hole will be those that match the wavelength geometry so that the CI location is where the tiny hole is.

As a result, each method and each device must be engineered to produce the type of amplifier needed. If a phase demodulator is to operate with an analog input, it will have to be of the averaged, multiple location (broad band) type. If it is to be used in a binary circuit, then the single wavelength-size location (narrow band) type will work quite well.

It is possible to produce a considerable number of composite operations by using a number of wavelength-size controllers having a common first location, but separate output locations; thus, a variety of signals are able to be handled all at once.

A frequency division demultiplexer is able to be produced by inputting the beams from different locations directed to a common location. Each different frequency will produce its CI at a different output location. If each output location has its own output hole in the image component separator, a complex group of frequencies in the input will be separated into separate outputs. Meanwhile, it will filter out any frequencies in between, because no output hole is provided for those frequencies, and no matching input frequency is provided.

If the control input is directed to a common location and a number of power inputs are used, each having a different frequency and a different location, the geometry is able to be arranged so that the CI locations all match, producing a very accurate frequency-selectable filter. All frequencies that match a power beam will have their CI at the common output hole. All other frequencies will not. The difference between this arrangement and the broad band averaging arrangement is that each of the frequencies that pass through the filter must match precisely the frequency and phase of the power beam. At wavelength sizes, filters are capable of providing the best selectivity of any known means, especially at light wave frequencies and beyond."

As can be seen from the foregoing discussion, the vector sums of coherent energy produce a great variety of logic, amplification, and energy beam control functions when these vector combinations are separated from various parts of an interference image by an image component separator. How these vector combinations are produced using any of the interference types depends upon the optics used to produce interference and upon the phase and amplitude relationships of the coherent input beams. Consequently, the many references herein to "constructive interference" and "destructive interference" can apply to all possible vector combinations of energy within an interference image, regardless of whether the vector sum produces a maxima, a minima, or some result in between. The term "constructive interference" can include any vector result that is greater than or equal to the simple addition of intensities, and the term "destructive interference" can include any vector result that is less than the simple addition of intensities. However, when phase relationships are being discussed, the terms apply to the maxima and minima where such phase relationships exist.

U.S. application Ser. No. 08/357,460 and U.S. Pat. No. 5,093,802 explain how these energy beam control, amplification, and logic functions are accomplished using coherent energy of a single frequency. Collectively, such devices and processes that produce interference-based functions are called "photonic transistors" because they are able to use photons to accomplish tasks formerly accomplished using electronic transistors.

The present invention adds the basic principle of frequency-multiplexed operation to provide all of the interference-based functions of separate photonic transistors simultaneously to individual frequency-multiplexed channels within a single device. As a result, single-channel devices are able to be connected to frequency-multiplexed devices, and frequency-multiplexed devices are able to be interconnected in the same organizational arrangements as are single-channel devices. The advantage of the present invention is that the individual compound operations now operate on a multi-channel basis using a single set of optics.

An important portion of the basic physics on which frequency multiplexing is based was first demonstrated in the nineteenth century when light having several spectral lines was passed first through a Fabry-Perot etalon and then through a prism. The etalon produced a composite multi-frequency interference image. Subsequent frequency separation by the prism separated the composite image into a set of individual interference fringes, one fringe for each wavelength. When the input slit was made very narrow, small portions of each fringe were separated by the prism.

This process is used today for accurately determining the relative wavelengths of several spectral lines. A description of this process is provided in many basic optics texts, including Fundamentals of Optics by Francis A. Jenkins and Harvey E. White, copyright 1976, McGraw-Hill. In that description and the accompanying photographs, applicant noted some features of its operation that go well beyond the topic under discussion and that were apparently not discussed or understood by the authors. These features have never, to applicant's knowledge, been noted or commented on in any scientific journal to this day. Specifically, in spite of the fact that the many interference fringes were produced simultaneously by the etalon, the separated images experienced no distortion because of the presence of interference among the other wavelengths. This indicated that any changes that might occur at one wavelength would not affect the images produced at the other wavelengths.

Applicant also noted that etalons have only one optical input, unlike photonic transistors that require two or more inputs so that the various combinations of input signals can be used to produce various combinations of interference images, which can then be separated to produce various functions in the output.

Combining the ability of frequency-multiplexed beams to produce independent but overlapping interference images with the functional activities of photonic transistors has resulted in the present invention; i.e., frequency-multiplexed logic, amplification, and energy beam control.

Single-frequency inputs produce amplification, energy control, and logic by defining the input beams relative to the output location(s). In the present invention, multiple-frequency channels are used as the input. Information is multiplexed into the individual channels outside of the invention. Broadband optics are used so that the entire spectrum band of the multiplexed information is able to pass through into the output after having been separated from specific locations chosen from within the individual interference images.

Whereas during applicant's work on the original photonic transistor U.S. Pat. No. 5,093,802, it seemed that somehow one should be able to design the invention so as to accommodate multiple wavelengths, the fundamental means for accomplishing that was missing. Only after considerable effort and study was the physical mechanism needed to accomplish frequency-multiplexed operation determined. Only then did it become clear that individual interference images are produced for each channel wavelength, and that broadband optics would be needed because the CI and DI regions of the individual interference images are generally not located at exactly the same place.

The exact frequencies used for each channel must be chosen so that any intermediate frequencies that are produced by the mixing of the input signals do not cross-talk into the other channels. Once properly selected, the interference images produced by the individual frequencies function separately from one another, even though they are located at the same general place, having outputs from common output location(s) within the image component separator.

Each channel of the frequency-multiplexed output behaves the same as described above for the single-frequency arrangement, except that now many simultaneous operations occur within the same optical arrangement. As a result, the present invention provides frequency-multiplexed logic, energy beam control, and amplification without demultiplexing the signals into separate devices for processing.

Combining the beam set concept from holographic images with frequency multiplexing of active functions produces a comprehensive means and method of performing frequency-multiplexed logic, amplification and energy beam control functions comprising the following steps:

1. producing a first frequency-multiplexed input including a first beam set having at least one beam of energy of at least one wavelength modulated with encoded information, and at least one second beam set having at least one beam of energy of at least one other wavelength modulated with encoded information;
2. producing a second frequency-multiplexed input including a third beam set having at least one third beam of energy of said at least one wavelength modulated with encoded information, and at least one fourth beam set having at least one beam of energy of said at least one other wavelength modulated with encoded information;
3. producing a first interference image with said first and third beam sets, and at least one other interference image with said second and fourth beam sets, and
4. separating energy from at least one location within said first interference image and at least one location within said at least one other interference image to provide at least one output having energy at said at least one wavelength, and said at least one other wavelength, wherein said functions are based on the constructive and destructive interference at said at least one location.

"Modulation" as used in the present application includes the status of being continuously on or continuously off, as such conditions are valid binary logic states.

The first and third beam sets, having the same wavelength, constitute the minimum of two inputs for a single channel. The first interference image is separated by an image component separator at the "at least one location" to produce the "at least one output."

The second and fourth beam sets, having the other wavelength, constitute the minimum of two inputs needed for another channel. Energy from the at least one other interference image at the "at least one other wavelength" is also separated from the "at least one location" into the "at least one output."

Obviously, many multiple channels having multiple beam set inputs can use this basic means and method, producing many outputs from many locations within the multiple images produced. In fact, very wide portions of the electromagnetic spectrum can be channelized so as to provide frequency-multiplexed functions containing many thousands of independent simultaneous functions. Such arrangements are limited only by the engineer's ability to organize, orient, and produce broadband optics capable of properly aligning the many interference images with the output locations of the image component separators.

The amplification function can be performed on a single channel using the basic invention by:

1. positioning the first interference image so that constructive interference occurs within said first interference image at said at least one location, and
2. maintaining said first beam set at a substantially constant above-zero level, thereby providing amplification at said at least one wavelength by producing an output at said at least one wavelength having energy from both the modulated third beam set and the constant first beam set.

Amplification can then be performed on any one of the channels by properly modulating the input signals for that channel, and separating energy from a CI position within the interference image for that channel.

All of the logic functions can be performed on a channel modulating the input signals with digital information and then separating the output from one or more places in the appropriate interference image to accomplish the logic function desired.

In this case, the first and third beam sets are modulated with digital information, thereby providing frequency-multiplexed digital logic based on constructive and destructive interference within said first interference image at said at least one wavelength.

Likewise with the other channels, the second and fourth beam sets are modulated with digital information, thereby providing said frequency-multiplexed digital logic based on constructive and destructive interference within said at least one other interference image at said at least one other wavelength simultaneously with and independent of said frequency-multiplexed logic based on constructive and destructive interference within said first interference image at said at least one wavelength.

One of the objects of the present invention is to provide frequency-multiplexed beam control using interference-based functions.

Another object of the present invention is to provide frequency-multiplexed amplifier using interference-based functions.

Another object of the present invention is to provide frequency-multiplexed Boolean logic using interference-based functions.

A further object of the present invention is to provide frequency-multiplexed, interference-based functions, including Boolean logic, amplification, and energy beam control.

The foregoing objects and benefits of the present invention will become clearer through an examination of the drawings, description of the drawings, description of the preferred embodiment, and claims which follow.

Please note that the beam angles, sizes, and proportions are exaggerated so as to provide for clarity of understanding.

DESCRIPTION OF THE PREFERRED EMBODIMENT

Figure 1:
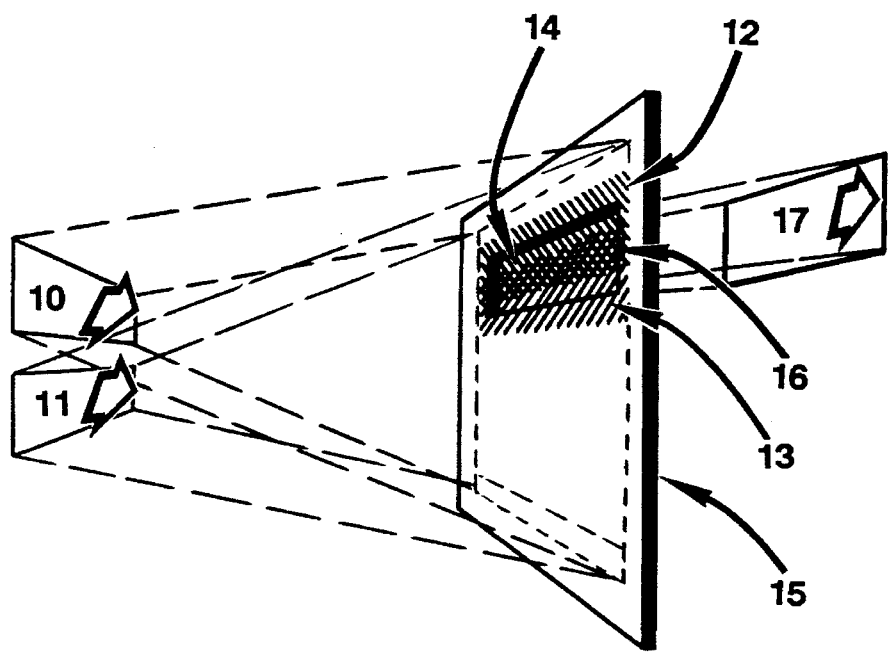
FIG. 1 is an operational view showing how the elementary frequency-multiplexed energy beam controller operates.

FIG. 1 is a perspective view showing an elementary embodiment of the present invention. Energy from a first frequency-multiplexed input (10) is superimposed upon the energy from a second frequency-multiplexed input (11) onto an image component separator (15).

The first frequency-multiplexed input includes a plurality of different wavelength channels including a first beam set having energy of at least one wavelength, and at least one other channel having energy of at least one other wavelength. Obviously, any additional channels would each have carrier wave beam sets at still other wavelengths.

Because multiple wavelengths can also be modulated with the same information, it is said that the first beam set has energy of "at least one wavelength."

The second frequency-multiplexed input (11) also includes a plurality of different wavelength channels, including a third beam set having energy at the same wavelength as the first beam set above, and a fourth beam set having energy at the same wavelength as the second beam set above.

Each frequency-multiplexed channel in each frequency-multiplexed input is separately modulated with information for controlling the interference-based functions.

Interference between input (10) and (11) produces overlapping interference images (12) and (13). The first interference image (12) is produced by the first and third beam sets identified as (24) and (25) in FIG. 2, and the at least one other interference image (13) is produced by the second and fourth beam sets identified as (28) and (29) in FIG. 2. The first, second, third, and fourth beam sets (24), (25), (28), and (29) are shown as vectors in FIG. 2. They are not specifically shown as independent entities in FIG. 1 and FIG. 3 because each is constituted of multiple individual beams.

The cross-hatching at (12) shows that portion of the first interference image that is to be separated into the at least one output (17). Cross-hatching at (13) is that portion of the at least one other interference image that is to be separated into the at least one output (17) also.

The cross-hatch at (16) is the overlapping area of the two images that are both to be separated into the at least one output (17).

The image component separator (15), in this case, is a mask with an opening (14) in it. By reason of its positioning and orientation with respect to the images, opening (14) permits energy from the desired component parts of the images to pass through into output (17).

Figure 2:
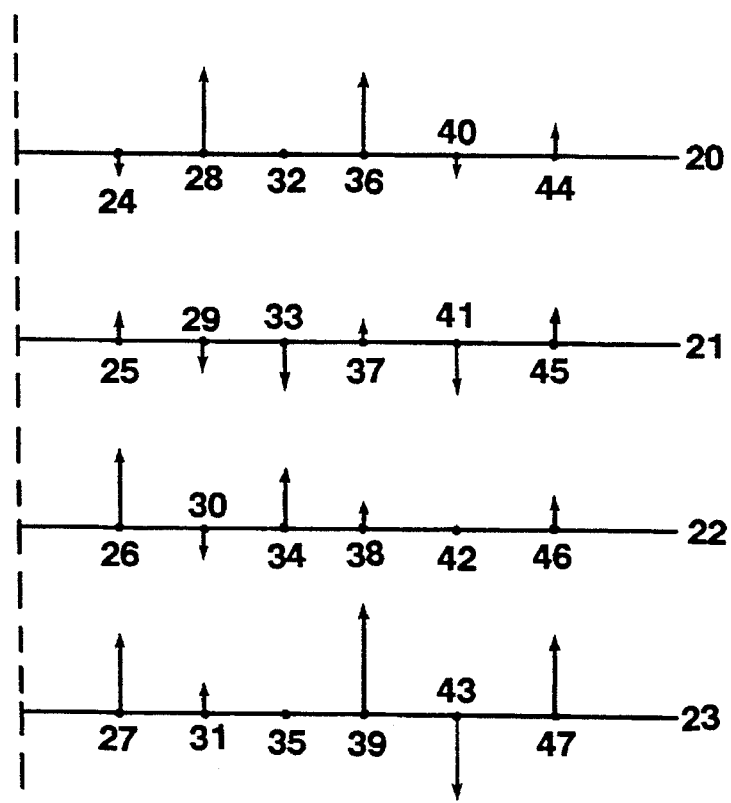
FIG. 2 is a spectral graph using vectors to illustrate and analyze the operation of the device of FIGS. 1 and 3.

FIG. 2 shows the spectral graphs of a more complex arrangement of the invention. Spectrums (20), (21), and (22) represent frequency-multiplexed inputs. Spectrum (23) is a frequency-multiplexed output. The amplitude vectors along each horizontal line represent each different frequency channel. Vectors of the various inputs and the output line up vertically. (Phase angles are not shown.)

For example, vectors (24), (25), and (26) represent the violet input. They combine to form a violet interference image. The violet output separated is represented by vector (27). This constitutes the violet channel. The same arrangement is shown for the blue channel vectors (28), (29), (30), and (31), the yellow channel vectors (32), (33), (34), and (35), the orange channel vectors (36), (37), (38), and (39), the red channel vectors (40), (41), (42), and (43), and, finally, the infrared channel vectors (44), (45), (46), and (47). Obviously, if one were to use white channelized light, there would be many more independent channels than can be shown in a simple illustration.

Considering FIG. 1 and FIG. 2 together, frequency-multiplexed input (10) has a channelized dynamic input spectrum that, for a given instant, is like spectrum (20). Frequency-multiplexed input (11), for that same instant, is like spectrum (21). As FIG. 1 is a two-input device, spectrum (22) is not used.

Each channel, represented by vectors such as (24) and (25), has its own interference image (12) produced by the common wide-band optics (not shown), and has its output (17) separated from that image. Each channel operates independently to produce a vectored output that is the vector sum of its vector inputs for all of the locations within opening (14) in image component separator (15).

Figure 3:
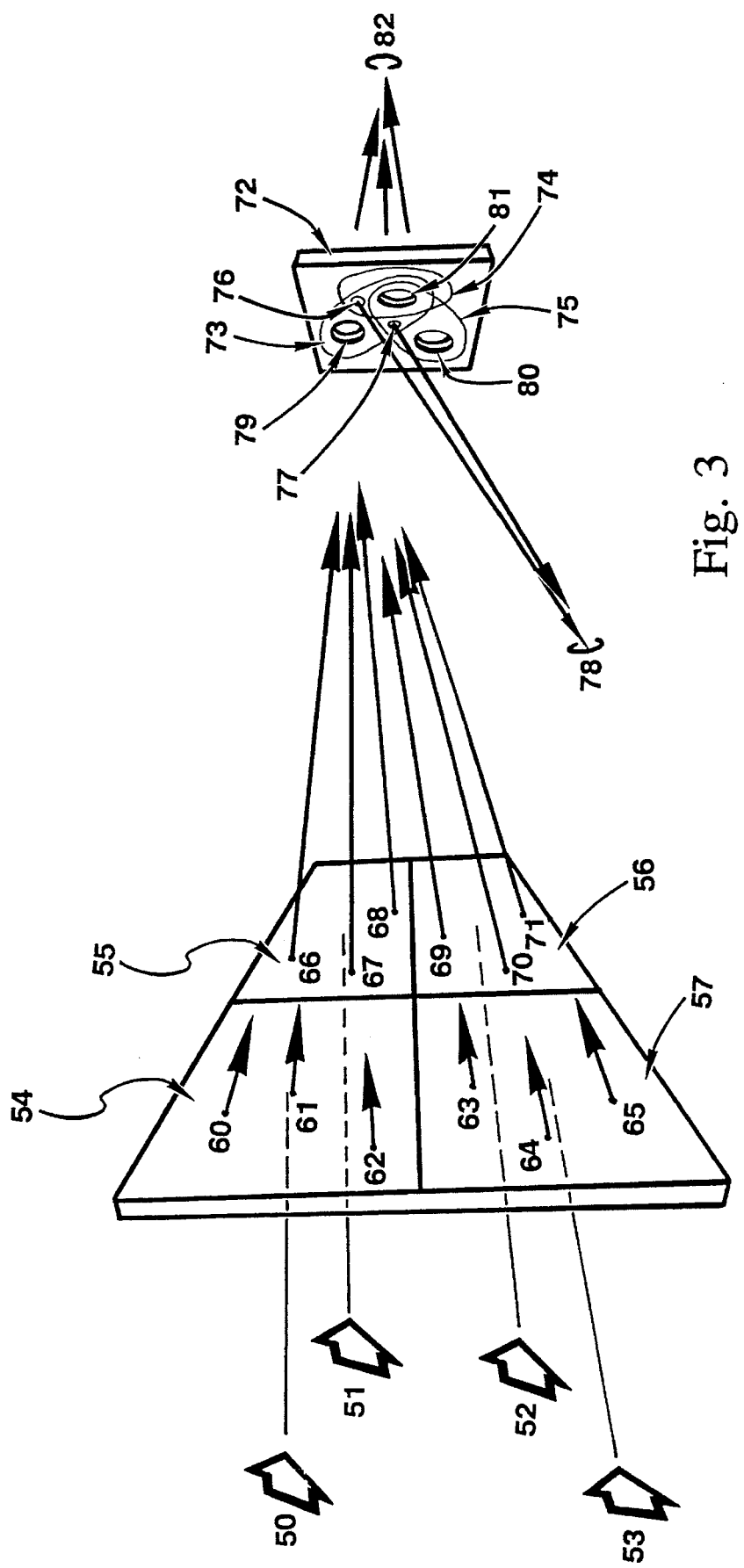
FIG. 3 is an operational view illustrating operation of one embodiment of the frequency-multiplexed energy beam controller utilizing hologram optics.

FIG. 3 shows a more complex arrangement using hologram optics. This illustration can be used to depict several types of input spectrums. The frequency-multiplexed inputs are (50), (51), (52), and (53). Since one of the possible modulation combinations includes one in which all of the channels are off except one, these inputs can also be monochromatic or quasi-monochromatic. A quasi-monochromatic input usually has several close-by frequency lines that are all modulated with the same information.

One of the most convenient ways of implementing the present invention is with computer-generated holograms. Holograms (54), (55), (56), and (57) can be individual holograms or subhologram parts of a larger hologram. By tracing through one channel at a time, we can understand how each channel operates independently, and then how it interrelates with the other channels in a particular optical design. The first we will trace is the violet channel with output (27).

Energy of frequency-multiplexed input (50) matches spectrum (20) and is directed to hologram (54). Each pixel, such as (60), (61), and (62), adjusts the phase, direction, and other properties of the energy arriving at that pixel just as if the hologram at that location were a tiny set of optical elements. These elements can be determined by a computer program and produce the proper interference images.

The arrows from pixels (60), (61), and (62) constitute part of the beam set for the particular channel (wavelength) under discussion. The full beam set includes all of the energy from all of the pixels of hologram (54) as they transmit violet light.

Hologram (54) is designed to provide a coordination of pixel-sized optical elements such that the energy from input (50) is directed toward image component separator (72). There, a violet channel image, image (73), is produced.

In order to accomplish energy control, amplification, and/or logic, at least two inputs are needed. Frequency-multiplexed input (51), which matches spectrum (21), is directed by the pixel elements, such as (66), (67), and (68) in hologram (55) so as to contribute their energy and modulation patterns to image (73). The violet beam set from hologram (55) is all of the energy from all of the violet-transmitting pixels of hologram (55), each transmitting pixel providing one beam to the beam Since the violet channel of frequency-multiplexed input (51) is modulated as a whole, all of the little violet beams coming from hologram (55) are also modulated with the same information (25). However, the violet channel in frequency-multiplexed input (50) is modulated with different information (24), which in turn causes all of the tiny violet beams of the violet beam set from hologram (54) to be modulated with common information.

Frequency-multiplexed input (52) is modulated with information (22), and is directed by hologram (56) with example pixels (69), (70), and (71). The three modulation patterns from frequency-multiplexed inputs (50), (51), and (52) are then combined to produce a dynamic interference image (73).

Image (73) comprises CI and DI components that change position as the input amplitudes and phases for that violet wavelength change. As a result, the energy of that wavelength changes depending on the instantaneous input vectors (24), (25), and (26) of the various input signals.

The functions performed also depend on the location(s) from which energy is separated within the channel image. Pixel-sized reflectors may be used at pixel locations (76) and (77) to separate and direct energy to a common output (78). Output (78) will contain the vector sum of the energy which arrives at locations (76) and (77), which is the vector sum of the energy within image (73) that comes from frequency-multiplexed inputs (50), (51), and (52) as arranged by holograms (54), (55), and (56). As a result, output (78) is the completely calculable result of the frequency-multiplexed inputs.

Frequency-multiplexed input (53) is an example of one of many other possible inputs that can be added. Likewise, it has an interference-producing hologram (57) and example pixel elements (63), (64), and (65), and it has its own set of vectored input channels like the others.

If any of the frequency-multiplexed inputs (50) through (53) contain energy of the violet channel, then that input will contribute to that channel's wavelength output (78). It will contain all of the vectored results in combination with whatever complex imaging arrangement is produced by the beam combining holograms (54) through (57). These combination vectors selected from the complex violet image produce the various individual interference-based functions that are preformed on that channel. The same is true for each of the other channels.

Next, we can consider another channel; for example, the blue channel with instantaneous input vectors (28), (29), and (30) which produces output vector (31) at at least one location within the blue image (75).

In this case, there are three inputs having a blue component: frequency-multiplexed inputs (50), (51), and (52). The same pixel elements that direct violet light may or may not direct the blue light. After all, one of the possible pixel elements could be a narrow-band filter that allows only a narrow range of channels through. However, all of those pixels that transmit blue light, such as (60) and (61), constitute the blue beam set from frequency-multiplexed input (50). Frequency-multiplexed inputs (51) and (52) also have their respective blue beam sets, as shown by the arrows from pixels (66), (67), and (68) and (69), (70), and (71) respectively.

As with the violet channel, the blue channel is independently modulated with encoded information; however, each tiny pixel beam in each input beam set is modulated with the same information. As a result, the changing modulation patterns within the blue interference image (75) change the CI and DI locations within the image, and the shape of the image and its relationship to the other channel images is controlled by the positioning, orientation, and type of optical elements at each pixel and the way they relate to the other optical element pixels within the same hologram and the image component separator.

Output-separating pixels (76) and (77) need to be considered. As can be seen by following the outlines for each image, output pixel (77) is located within the blue image (75), while output pixel (76) is not within the blue image. Thus, output pixel (77) contributes to the blue output at (78), but output pixel (76) does not.

The red channel, as shown by vectors (40), (41), and (42) of FIG. 2, is input on frequency-multiplexed inputs (50), (51), and (52), resulting in red beam sets from holograms (54), (55), and (56) that produce the red image (74). In this case, output pixel (76) contributes to output (78) and output pixel (77) does not.

Interference is a wavelength-dependent phenomenon. As a result, the channel images tend to be spatially adjusted relative to each other. This means that parts of the images overlap, and parts of them do not. The pixel optical elements that are able to make up the image component separator (72) are stationary, so the amplitude and phase of any light contributed to output (78) depends on where the images are located relative to the output pixels, what part of the images, CI, DI or in between, appear at those output locations, and how the phase, direction, and other parameters of the energy at each energy-separating pixel are treated by the output pixel optics.

By calculating the images produced by an array of pixel optics, a computer program is able to determine what output waveforms will result from various modulation patterns within each channel and thereby determine the optimal arrangement of pixel optics needed within the holograms in order to produce an optimal set of channel images. The optimal set of output pixel elements can be calculated by the same method, producing the desired frequency-multiplexed outputs.

Another output example is shown by the three strategically-placed openings (79), (80), and (81) in image component separator (72). These can be pixel-sized openings or larger openings that each take up a number of pixel positions as shown. Like the mirror at output pixel (76), these openings can actually include optical elements for coordinating the energy separated from each location as it combines at output (82). Such optical elements can include lenses, mirrors, phase shifters, filters, or any other optical element or group of optical elements that are positioned and oriented so as to direct energy into output (82).

In practicing the present invention, any number of frequency-multiplexed inputs within the physical limits of the beam-combining optics can be used. The only real limitation as to the number of channels that can be included is the bandpass characteristics of the optics used. As a result, a great number of energy beam control, amplification, and logic functions can be accomplished on the information frequency-multiplexed into the input and output beams.

While the foregoing description of the preferred embodiment of the present invention has disclosed specific constructions, means, and methods of accomplishing the present invention, and because specific improvements and modifications will become readily apparent to those skilled in the art of computers and optical devices and the like, it is applicant's intent not to be limited by any of the foregoing descriptions, but only by the claims which follow.

What is claimed is:

1. A method of performing frequency-multiplexed logic, amplification, and energy beam control functions comprising the following steps:

producing a first frequency-multiplexed input including a first beam set having at least one beam of energy of at least one wavelength modulated with information, and at least one second beam set having at least one beam of energy of at least one other wavelength modulated with information;

producing a second frequency-multiplexed input including a third beam set having at least one beam of energy of said at least one wavelength modulated with information, and at least one fourth beam set having at least one beam of energy of said at least one other wavelength modulated with information;

producing a first interference image with said first and third beam sets, and at least one other interference image with said second and fourth beam sets, and separating energy from at least one location within said first interference image and from at least one location within said at least one other interference image to provide at least one output having energy at said at least one wavelength and said at least one other wavelength, wherein said functions are based on the constructive and destructive interference within said interference images.

2. The invention of claim 1:

wherein:

constructive interference occurs at said at least one location within said first interference image, and including:

maintaining said first beam set at a substantially constant above-zero level, thereby providing amplification at said at least one wavelength.

3. The invention of claim 1:

wherein:

said information with which said first and third beam sets are modulated is digital information, thereby providing frequency-multiplexed digital logic based on constructive and destructive interference within said first interference image at said at least one wavelength.

4. The invention of claim 3:

wherein:

said information with which said second and fourth beam sets are modulated is digital information, thereby providing said frequency-multiplexed digital logic based on constructive and destructive interference within said at least one other interference image at said at least one other wavelength simultaneously with and independent of said frequency-multiplexed logic based on constructive and destructive interference within said first interference image at said at least one wavelength.

5. The invention of claim 1:

wherein:

said at least one output is taken from a plurality of locations within said interference images, and including:

processing separated energy using at least one optical element at each of said plurality of locations so as to coordinate energy from each of said plurality of locations as it is directed into said at least one output.

6. A frequency multiplexer for use with wave-type energy, comprising:

a first frequency-multiplexed input means including a first beam set having at least one beam of energy of at least one wavelength modulated with information, and at least one second beam set having at least one beam of energy of at least one other wavelength modulated with information;

a second frequency-multiplexed input means including a third beam set having at least one beam of energy of said at least one wavelength modulated with information, and at least one fourth beam set having at least one beam of energy of said at least one other wavelength modulated with information;

directing means for directing said first, second, third, and fourth beam sets so as to produce a first interference image with said first and third beam sets, and at least one other interference image with said second and fourth beam sets, and image component separating means for separating energy from at least one location within said first interference image and from at least one location within said at least one other interference image to provide at least one output having energy at said at least one wavelength and said at least one other wavelength.

7. The invention of claim 6:

wherein:

said directing means is positioned and oriented so that constructive interference occurs at said at least one location within said first interference image, and including:

means for maintaining said first beam set at a substantially constant above-zero level, thereby providing amplification at said at least one wavelength.

8. The invention of claim 6:

wherein:

said information with which said first and third beam sets are modulated is digital information, thereby providing frequency-multiplexed digital logic based on constructive and destructive interference within said first interference image at said at least one wavelength.

9. The invention of claim 8:

wherein:

said information with which said second and fourth beam sets are modulated is digital information, thereby providing said frequency-multiplexed digital logic based on constructive and destructive interference within said at least one other interference image at said at least one other wavelength simultaneously with and independent of said frequency-multiplexed logic based on constructive and destructive interference within said first interference image at said at least one wavelength.

10. The invention of claim 6:

wherein:

said at least one output is taken from a plurality of locations within said interference images, and including:

processing means for processing separated energy using at least one optical element at each of said plurality of locations so as to coordinate energy from each of said plurality of locations as it is directed into said at least one output.

* * * * *